United States Patent
Jeong et al.

(10) Patent No.: US 8,990,575 B2
(45) Date of Patent: Mar. 24, 2015

(54) APPARATUS AND METHOD FOR ELECTRONIC SIGNATURE VERIFICATION

(71) Applicant: Samsung Electronics Co., Ltd., Suwon-si (KR)

(72) Inventors: Min Kyu Jeong, Yongin-si (KR); Yong Sam Shin, Hwasung-si (KR); Seung Won Lee, Hwasung-si (KR); Shi Hwa Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/775,999

(22) Filed: Feb. 25, 2013

(65) Prior Publication Data

US 2013/0246797 A1    Sep. 19, 2013

(30) Foreign Application Priority Data

Mar. 16, 2012    (KR) .................. 10-2012-0027033

(51) Int. Cl.
*H04L 29/06*    (2006.01)
*H04L 9/32*    (2006.01)

(52) U.S. Cl.
CPC ............ *H04L 9/3255* (2013.01); *H04L 9/3247* (2013.01)
USPC ........... 713/176; 713/155; 713/158; 713/189; 726/2; 726/3; 726/26

(58) Field of Classification Search
CPC ............................ H04L 9/3247; H04L 9/3255
USPC .................. 713/176, 155, 175; 380/44; 726/1
See application file for complete search history.

(56) References Cited

U.S. PATENT DOCUMENTS

| | | | |
|---|---|---|---|
| 7,243,240 B2* | 7/2007 | Wang ............................ | 713/189 |
| 8,407,757 B2* | 3/2013 | Graham et al. .................. | 726/1 |
| 8,784,195 B1* | 7/2014 | Crowder, Jr. .................... | 463/29 |
| 2008/0095360 A1* | 4/2008 | Vuillaume et al. .............. | 380/44 |
| 2008/0270786 A1* | 10/2008 | Brickell et al. ............... | 713/155 |
| 2008/0320557 A1 | 12/2008 | Hakuta et al. | |
| 2009/0019285 A1* | 1/2009 | Chen et al. .................... | 713/175 |
| 2009/0287933 A1* | 11/2009 | Beckwith et al. ............. | 713/176 |

FOREIGN PATENT DOCUMENTS

| | | |
|---|---|---|
| JP | 2004-78622 | 3/2004 |
| JP | 2005-346570 | 12/2005 |
| JP | 2006-65712 | 3/2006 |
| KR | 2001-0067759 | 7/2001 |
| KR | 2002-0083481 | 11/2002 |
| KR | 10-2004-0078622 | 9/2004 |
| KR | 10-0797487 | 1/2008 |
| KR | 10-0817707 | 3/2008 |

* cited by examiner

*Primary Examiner* — Jason Lee
(74) *Attorney, Agent, or Firm* — NSIP Law

(57) ABSTRACT

An apparatus for electronic signature verification, including a grouping unit to group, into at least one group, a plurality of kernels included in an application to which electronic signature verification is to be performed, and an electronic signature verification unit to perform electronic signature verification with respect to the at least one group.

17 Claims, 3 Drawing Sheets ively great cost, for example, a relatively great amount of time and power. Accordingly, when individual verification is performed with respect to an electronic signature of each of the kernels, system performance may be degraded.
APPARATUS AND METHOD FOR ELECTRONIC SIGNATURE VERIFICATION

CROSS-REFERENCE TO RELATED APPLICATIONS

This application claims the priority benefit of Korean Patent Application No. 10-2012-0027033, filed on Mar. 16, 2012, in the Korean Intellectual Property Office, the disclosure of which is incorporated herein by reference.

BACKGROUND

1. Field

Example embodiments of the following description relate to an apparatus and method for electronic signature verification, and more particularly, to an apparatus and method to perform integral electronic signature verification with respect to an application and/or kernels included in the application in an open computing environment.

2. Description of the Related Art

In an open standard based heterogeneous computing environment, a host, for example, a central processing unit (CPU), may download and drive an application from a server.

The application may include a host program and a kernel code or a kernel binary code.

The kernel code may generate a binary code through cross compiling when the host drives the application. The kernel binary code may operate to perform a corresponding binary code with respect to a target, for example, a CPU, and to receive the corresponding result.

The application may be updated for each kernel even after the application is installed. Creators and distributors may be different between kernels that constitute a single application.

Accordingly, when the host installs and executes the application, a process of verifying an electronic signature that is distributed by a creator and a distributor based on a public key may be used to prevent a malicious attack, such as, a code change of a kernel unit, a binary change, and the like.

However, electronic signature verification is usually performed at relatively great cost, for example, a relatively great amount of time and power. Accordingly, when individual verification is performed with respect to an electronic signature of each of the kernels, system performance may be degraded.

SUMMARY

The foregoing and/or other aspects are achieved by providing an apparatus for electronic signature verification, including a grouping unit to group, into at least one group, a plurality of kernels included in an application to which electronic signature verification is to be performed, and an electronic signature verification unit to perform electronic signature verification with respect to the at least one group.

The electronic signature verification may be performed with respect to the application in an open standard based heterogeneous computing environment.

The electronic signature verification apparatus may further include a signatory identifier to identify an electronic signatory of each of the plurality of kernels.

The grouping unit may group the plurality of kernels into the at least one group by classifying the plurality of kernels for each identified signatory.

The electronic signature verification unit may perform integral electronic signature verification with respect to at least one kernel that is included in a first group of the at least one group. The electronic signature verification unit may further include a parallel processing unit including a plurality of processor cores.

The parallel processing unit may perform parallel processing of electronic signature verification with respect to the at least one group using the plurality of processor cores.

At least one electronic signatory among electronic signatories of the plurality of kernels may be different from an electronic signatory of the application. The electronic signature verification may be a verification procedure that is performed to verify validity of the application when installing or using the application.

The foregoing and/or other aspects are achieved by providing a method for electronic signature verification, including grouping, into at least one group, a plurality of kernels included in an application to which electronic signature verification is to be performed, and performing electronic signature verification with respect to the at least one group.

The electronic signature verification method may further include identifying an electronic signatory of each of the plurality of kernels. The grouping may include grouping the plurality of kernels into the at least one group by classifying the plurality of kernels for each identified signatory.

The performing may include performing integral electronic signature verification with respect to at least one kernel that is included in a first group of the at least one group. The performing may include performing parallel processing of electronic signature verification with respect to the at least one group using a plurality of processor cores, when the performing is performed by the plurality of processors.

The foregoing and/or other aspects are achieved by providing a method for electronic signature verification, the method including sorting a plurality of kernels into different groups; assigning each group of the different groups to a core, among a plurality of cores, for processing; and performing the electronic signature verification, by the assigned core, with respect to each group of the different groups.

The sorting may be based on an electronic signatory of each kernel.

The performing of the electronic signature verification may occur during an installation of an application. The application may include the plurality of kernels.

The performing may include performing integral electronic signature verification with respect to at least one kernel that is included in a first group of the different groups.

The performing of the electronic signature verification may be performed by each core of the plurality of cores in parallel.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
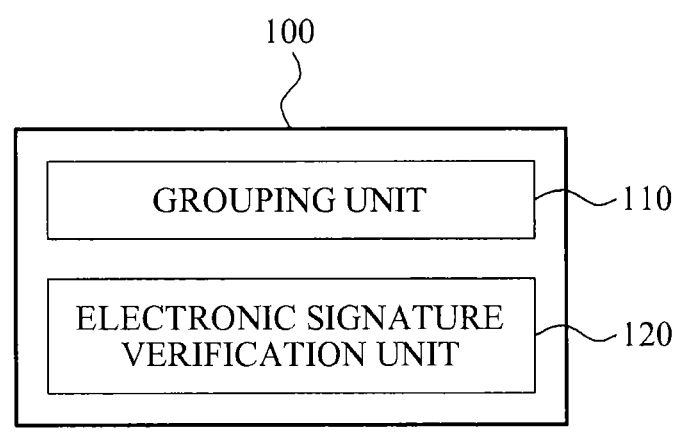
FIG. 1 illustrates an electronic signature verification apparatus, according to an example embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an electronic signature verification apparatus 100, according to an example embodiment.

In the case of a single application that includes a plurality of kernels, even after the application is installed, the application may be updated for each kernel. Creators and distributors may be different between the kernels that constitute the single application.

When an application is installed and is executed through a network, the application may receive a malicious attack. For example, when a host downloads the application from a server, the host may receive a malicious attack, for example, a code change or a binary change of the application, malicious distribution of the application by a malicious application developer, and a code change or a binary change of the application when installation and execution of an application is performed by a host program.

To prevent the above malicious attack, however, a creator and a distributor may distribute an application using a public key based electronic signature, as in a case where a web browser distributes and installs the application. During the installing and executing of the application, an electronic signature may need to be verified and then be used.

However, a relatively large amount of cost may be used for an electronic signature verification process.

Depending on embodiments, the electronic signature verification apparatus 100 may group the electronic signature verification for each signatory, and may quickly process verification of electronic signatures that are signed by the same signatory through an integral process. Further, according to an example embodiment, the electronic signature verification apparatus 100 may include a grouping unit 110 and an electronic signature verification unit 120.

The grouping unit 110 of the electronic signature verification apparatus 100 may group, for each signatory, a plurality of kernels that constitute a first application that is a target of electronic signature verification.

When individual electronic signature verification is performed with respect to each of the plurality of kernels having electronic signatures signed by the same signatory, a large amount of system resources may be used, and thus, a speed of electronic signature verification may be very slow.

Accordingly, the grouping unit 110 may group the plurality of kernels in advance for each signatory, so that electronic signature verification may be integrally performed with respect to the kernels having electronic signatures signed by the same signatory.

When the grouping unit 110 groups the plurality of kernels included in the first application into a plurality of groups for each signatory, an electronic signature verification unit 120 may perform integral electronic signature verification for each group.

When a processor that substantially performs the electronic signature verification of the present disclosure, such as a central processing unit (CPU), a graphics processing unit (GPU), an application processor (AP), and the like for example, is based on a multi-core, the processor may perform parallel processing of the electronic signature verification for each group. Example embodiments will be further described with reference to FIG. 3.

Figure 2:
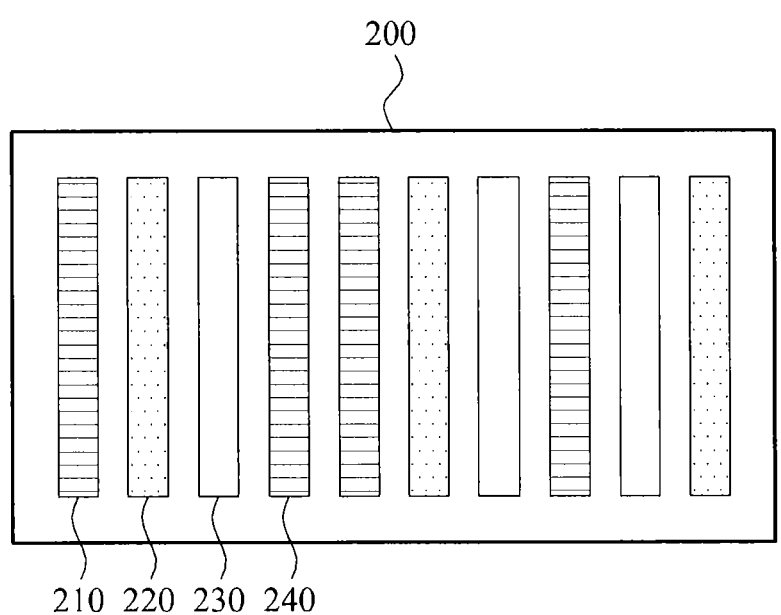
FIG. 2 illustrates an example of a first application to which electronic signature verification is to be performed, according to an example embodiment.

FIG. 2 illustrates an example of a first application 200 to which electronic signature verification is to be performed, according to an example embodiment.

Referring to FIG. 2, the first application 200 may include a plurality of kernels, for example, a first kernel 210, a second kernel 220, a third kernel 230, and a fourth kernel 240. Although FIG. 2 shows a first kernel 210, a second kernel 220, a third kernel 230, and a fourth kernel 240, the present disclosure is not limited thereto.

Even after the first application 200 is installed in a host computing apparatus, the first application 200 may be updated for each kernel. Creators and distributors may be different between the plurality of kernels that constitute the first application 200. Accordingly, entities to perform an electronic signature may be different from each other.

For example, the first application 200 may include the first kernel 210, the second kernel 220, the third kernel 230, and the fourth kernel 240.

In this instance, a signatory of the first kernel 210 may be different from a signatory of the second kernel 220, the signatory of the second kernel 220 may be different from a signatory of the third kernel 230, and the signatory of the third kernel 230 may be different from a signatory of the fourth kernel 240. As such, the signatories of each of the kernels may also be different from each other.

Depending on embodiments, the signatory of the first kernel 210 may be identical to the signatory of the fourth kernel 240. The plurality of kernels may be signed by different signatories or the same signatory to thereby constitute the first application 200. The present disclosure is not limited to these described examples.

The group unit 110 may group, into a plurality of groups for each signatory, the plurality of kernels that are included in the first application 200.

In this case, for example, the first kernel 210 and the fourth kernel 240 may be included in the same group, and each of the second kernel 220 and the third kernel 230 may be included in a different group. Grouping result will be further described with reference to FIG. 4.

After performing grouping as described above, the electronic signature verification unit 120 of the electronic signature verification apparatus 100 may perform integral electronic signature verification for each group.

Figure 3:
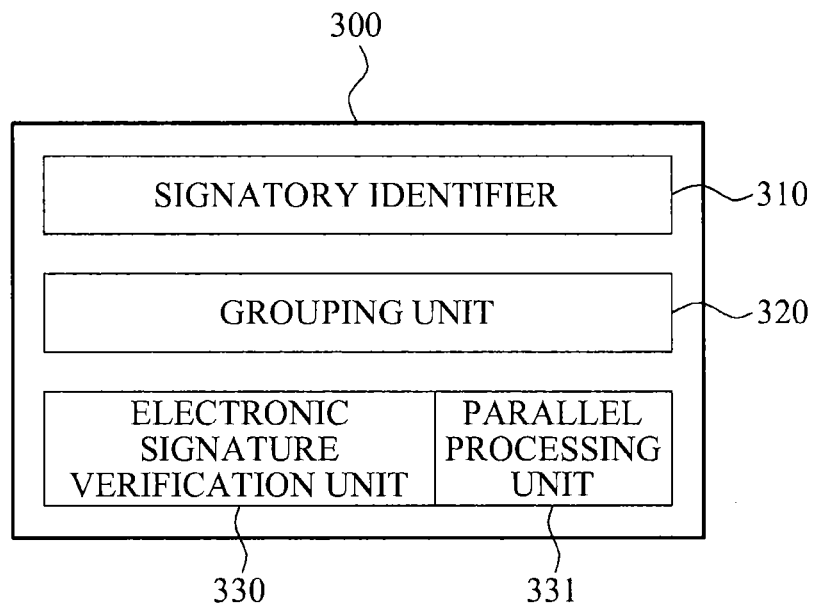
FIG. 3 illustrates an electronic signature verification apparatus further including a signatory identifier and a parallel processing unit, according to an example embodiment.

FIG. 3 illustrates an electronic signature verification apparatus 300 further including a signatory identifier 310 and a parallel processing unit 331, according to an example embodiment.

The signatory identifier 310 of the electronic signature verification apparatus 300 may identify a signatory of each of the kernels that constitute the first application 200 of FIG. 2.

A grouping unit 320 may generate a plurality of kernel groups that are classified for each signatory by grouping, into a single group, kernels signed by the same signatory with respect to the plurality of kernels identified by the signatory identifier 310.

An electronic signature verification unit 330 may perform electronic signature verification with respect to each of the grouped kernel groups.

For example, when the first kernel 210 and the fourth kernel 240 that are included in the same group, i.e., the first kernel 210 and the fourth kernel 240 are signed by the same signatory, the electronic signature verification unit 330 may not separately perform electronic signature verification on each of the first kernel 210 and the fourth kernel 240. The electronic signature verification unit 330 may perform integral electronic signature verification with respect to the entire kernels that are included in the group including the first kernel 210 and the fourth kernel 240.

Accordingly, since the amount of processing needed for the electronic signature verification process for kernels is significantly reduced, an amount of time used for the electronic signature verification may decrease and power consumption or the efficiency of computation resources may be enhanced.

According to an example embodiment, when a computation resource to perform an electronic signature is based on a multi-core processor, the parallel processing unit 331 may be further included in the electronic signature verification apparatus 300.

The electronic signature verification unit 330 may perform integral electronic signature verification with respect to each of the plurality of kernel groups. During the above process, the parallel processing unit 331 may perform parallel processing of electronic signature verification by assigning the plurality of groups to a plurality of cores (not shown), respectively. That is, the processing of a respective group may be performed by a respective core, among the plurality of cores.

A process of grouping kernels into a plurality of kernel groups and parallel processing and performing electronic signature verification of each of the kernel groups will be further described with reference to FIG. 4.

Figure 4:
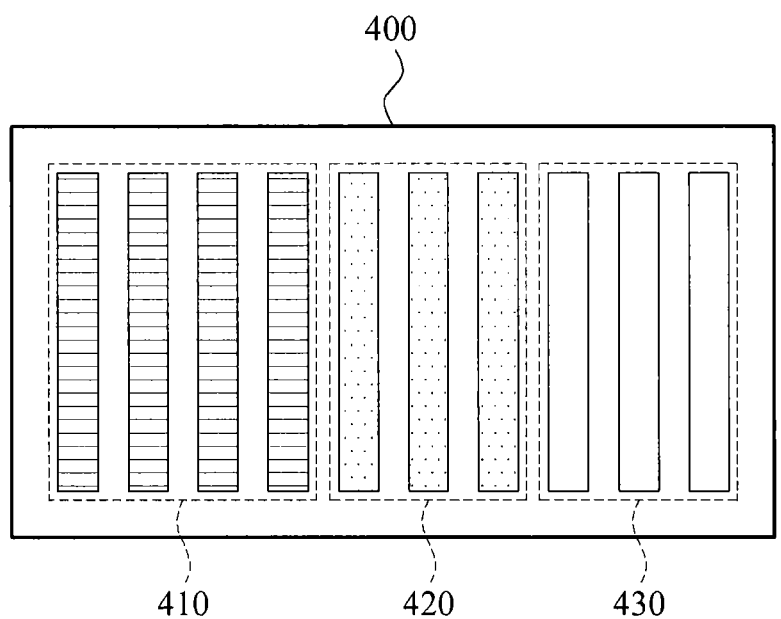
FIG. 4 illustrates an example of a first application grouped for each signatory through a signatory identifier and a grouping unit, according to an example embodiment.

FIG. 4 illustrates an example of a first application 400 grouped for each signatory through the signatory identifier 310 and the grouping unit 320, according to an example embodiment.

In the case of the first application 200 of FIG. 2, even after the first application 200 is installed in a host computing apparatus, the first application 200 may be updated for each kernel. Creators and distributors may be different between kernels that constitute the first application 200, and thus, entities that perform an electronic signature may also be different from each other.

Accordingly, the signatory identifier 310 of the electronic signature verification apparatus 300 of FIG. 3 may identify a signature of each of the kernels that constitute the first application 200.

The grouping unit 320 may generate a plurality of kernel groups that are classified for each signatory by grouping, into a single group, kernels having the same signatory with respect to the kernels identified by the signatory identifier 310.

When the first application 200 of FIG. 2 is input to the electronic signature verification apparatus 300 for electronic signature verification, the signatory identifier 310 may identify a signatory of each of the kernels, for example, the first kernel 210, the second kernel 220, the third kernel 230, and the fourth kernel 240 that constitute the first application 200.

The signatory identifier 310 or the grouping unit 320 may generate a plurality of groups classified for each signatory by grouping, into a single group, kernels having the same signatory based on the identification result of the signatory identifier 310.

Accordingly, with respect to the plurality of kernels, for example, the first kernel 210, the second kernel 220, the third kernel 230, and the fourth kernel 240, which constitute the first application 200, the signatory identifier 310 may identify a signatory and may generate a group by classifying the identified kernels, for example, the first kernel 210, the second kernel 220, the third kernel 230, and the fourth kernel 240 into a first group 410, a second group 420, and a third group 430. For example, the first kernel 210 and the fourth kernel 240 may have the same signatory and may be grouped in the first group 410, the second kernel 220 may be grouped in the second group 420, and the third kernel 230 may be grouped in the third group 430.

Kernels included in the first group 410 may have the same signatory, kernels included in the second group 420 may also have the same signatory, and kernels included in the third group 430 may also have the same signatory.

Accordingly, kernels included in the same group may have the same signatory, and signatories among the first group 410, the second group 420, and the third group 430 may be different from each other.

Figure 5:
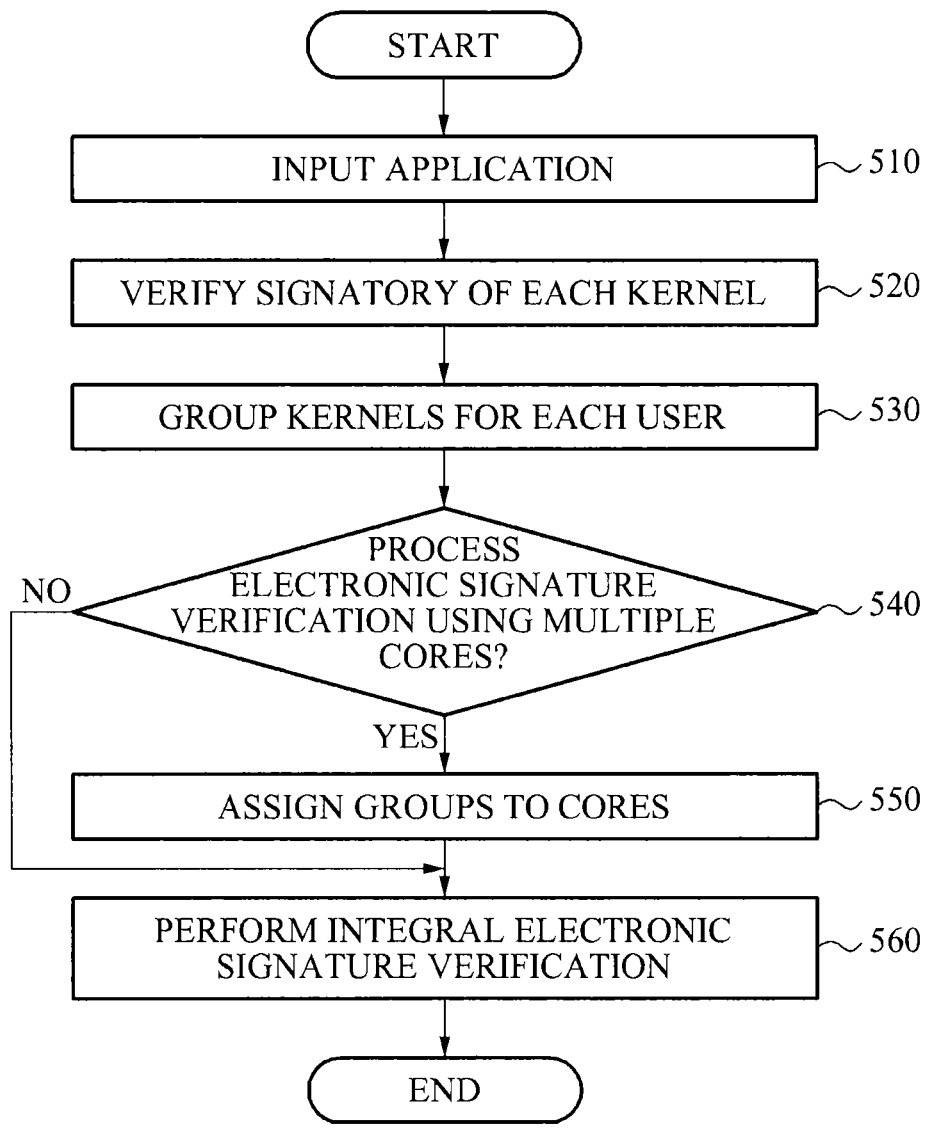
FIG. 5 illustrates a method for electronic signature verification, according to an example embodiment.

FIG. 5 illustrates a method for electronic signature verification, according to an example embodiment.

To prevent a malicious attack against the first application 200 including a plurality of kernels, for example, the first kernel 210, the second kernel 220, the third kernel 230, and the fourth kernel 240 signed by the respective different signatory of FIG. 2, electronic signature verification may be performed.

When a process of installing and updating the first application 200 is repeated, or from the initial installation, the plurality of kernels, for example, the first kernel 210, the second kernel 220, the third kernel 230, and the fourth kernel 240, that constitute the first application 200 may be signed by the respective different signatories and thereby be present.

When installing and executing the first application 200, verification of an electronic signature may be performed through an electronic signature verification apparatus.

When the first application 200 is inputted to the electronic signature verification apparatus 300 of FIG. 3 in operation 510, the signatory identifier 310 may verify a signatory with respect to each of the kernels that constitute the first application 200.

The kernels that constitute the first application 200 may be signed by different signatories, or may be signed by the same signatory. Accordingly, the signatory identifier 310 may identify a signatory of each of the kernels, for example, the first kernel 210, the second kernel 220, the third kernel 230, and the fourth kernel 240, for integral electronic signature verification of the electronic signature verification unit 330 in operation 520.

In operation 530, the grouping unit 320 may generate a plurality of groups classified for each signatory by grouping, into a single group, kernels having the same signatory as the identification result of the signatory identifier 310.

Referring to FIG. 4, when a signatory is identified for each kernel in operation 520 and thereby identified kernels are grouped in operation 530, the kernels included in the first group 410 of the first application 400 may have the same signatory.

In addition, kernels of the second group 420 may have the same signatory as each other and kernels of the third group 430 may have the same signatory as each other. That is, a signatory may be the same with respect to kernels included in the same group.

Accordingly, the grouping unit 320 may generate a plurality kernel groups classified for each signatory by grouping, into a single group, kernels having the same signatory.

In operation 540, it is determined whether the electronic signature verification is processed using multiple cores. If the result is "Yes", then the identified groups are assigned to the cores in operation 550. As only an example, the first group 410 may be assigned to a first core, the second group 420 may be assigned to a second core, and so on. However, the present disclosure is not limited thereto. If the result is "No", then the method proceeds to operation 560.

In operation 560, the electronic signature verification unit 330 may perform electronic signature verification with respect to each of the grouped kernel groups.

In the case of a plurality of kernels that are included in the same group such as the first group 410, the second group 420, and the third group 430, for example, in the case of the first kernel 210 and the fourth kernel 240 included in the first group 410, the first kernel 210 and the fourth kernel 240 may have the same signatory, and thus, for example, the electronic signature verification unit 330 may perform integral electronic signature verification with respect to the entire kernels that are included in the first group 410 including the first kernel 210 and the fourth kernel 240, instead of performing separate electronic signature verification with respect to the first kernel 210 and the fourth kernel 240.

The electronic signature verification method according to the above-described embodiments may be recorded in non-transitory computer-readable media including program instructions to implement various operations embodied by a computer. The media may also include, alone or in combination with the program instructions, data files, data structures, and the like. The results produced can be displayed on a display of the computing hardware. Examples of non-transitory computer-readable media include magnetic media, such as, hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW. The described hardware devices may be configured to act as one or more software modules in order to perform the operations of the above-described embodiments, or vice versa.

Further, according to an aspect of the embodiments, any combinations of the described features, functions and/or operations can be provided.

Moreover, the various example embodiments of the electronic signature verification apparatus described above may include at least one processor to execute at least one of the above-described units and methods.

According to embodiments, there may be provided an apparatus and method for electronic signature verification to minimize cost, for example, time and power when an electronic signature is performed in an open computing system.

In addition, according to embodiments, there may be provided an apparatus and method for electronic signature verification to improve a speed of electronic signature verification through parallel processing of the electronic signature verification.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for electronic signature verification, the apparatus comprising:
a processor, comprising:
a grouping unit to group a plurality of kernel code included in an application into at least one group; and
an electronic signature verification unit to perform electronic signature verification with respect to the plurality of kernel code included in the at least one group at a time of application installation,
wherein the electronic signature verification unit comprises a parallel processing unit comprising a plurality of processor cores, and the parallel processing unit performs parallel processing of the electronic signature verification with respect to the at least one group using the plurality of processor cores.

2. The apparatus of claim 1, wherein the electronic signature verification is performed with respect to the application in an open standard based heterogeneous computing environment.

3. The apparatus of claim 1, further comprising: a signatory identifier to identify an electronic signatory of each of the plurality of kernel code, wherein the grouping unit groups the plurality of kernel code into the at least one group by classifying the plurality of kernel code based on the identified signatory.

4. The apparatus of claim 1, wherein the electronic signature verification unit performs integral electronic signature verification with respect to at least one kernel code that is included in a first group of the at least one group.

5. The apparatus of claim 1, wherein at least one electronic signatory among electronic signatories of the plurality of kernel code is different from an electronic signatory of the application.

6. The apparatus of claim 1, wherein the electronic signature verification is a verification procedure that is performed to verify validity of the application when installing or using the application.

7. A method for electronic signature verification, the method comprising:
grouping a plurality of kernel code included in an application into at least one group; and
performing, at a time of application installation, electronic signature verification with respect to the plurality of kernel code included in the at least one group,
wherein the performing comprises performing parallel processing of the electronic signature verification with respect to the at least one group using a plurality of processor cores, when the performing is performed by the plurality of processor cores.

8. The method of claim 7, further comprising: identifying an electronic signatory of each of the plurality of kernel code, wherein the grouping comprises grouping the plurality of kernel code into the at least one group by classifying the plurality of kernel code based on the identified signatory.

9. The method of claim 7, wherein the performing comprises performing integral electronic signature verification with respect to at least one kernel code that is included in a first group of the at least one group.

10. A non-transitory computer-readable medium comprising a program for instructing a computer to perform a method for electronic signature verification, the method comprising:
grouping a plurality of kernel code included in an application into at least one group; and
performing, at a time of application installation, electronic signature verification with respect to the plurality of kernel code included in the at least one group,
wherein the performing comprises performing parallel processing of the electronic signature verification with respect to the at least one group using a plurality of processor cores, when the performing is performed by the plurality of processor cores.

11. The non-transitory computer-readable medium of claim 10, wherein the method further comprises: identifying an electronic signatory of each of the plurality of kernel code, and the grouping comprises grouping the plurality of kernel code into the at least one group by classifying the plurality of kernel code based on the identified signatory.

12. The non-transitory computer-readable medium of claim 10, wherein the performing comprises performing integral electronic signature verification with respect to at least one kernel code that is included in a first group of the at least one group.

13. A method for electronic signature verification, the method comprising:
   sorting a plurality of kernel code into different groups;
   assigning each group of the different groups to a core, among a plurality of cores, for processing; and
   performing, at a time of application installation, electronic signature verification, by the assigned core, with respect to each group of the different groups,
   wherein the performing of the electronic signature verification is performed by each core of the plurality of cores in parallel.

14. The method of claim 13, wherein the sorting is based on an electronic signatory of each kernel code.

15. The method of claim 13, wherein the performing of the electronic signature verification occurs during an installation of an application.

16. The method of claim 15, wherein the application comprises the plurality of kernel code.

17. The method of claim 13, wherein the performing comprises performing integral electronic signature verification with respect to at least one kernel code that is included in a first group of the different groups.

* * * * *